(12) United States Patent
Onomatsu et al.

(10) Patent No.: US 7,554,613 B2
(45) Date of Patent: Jun. 30, 2009

(54) ANALOG TELEVISION BROADCAST SIGNAL RECEIVER

(75) Inventors: Takehiro Onomatsu, Daito (JP); Shusuke Narita, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 742 days.

(21) Appl. No.: 11/302,115

(22) Filed: Dec. 14, 2005

(65) Prior Publication Data

US 2006/0139499 A1    Jun. 29, 2006

(30) Foreign Application Priority Data

Dec. 15, 2004    (JP)    ............... 2004-362118

(51) Int. Cl.
  *H04N 5/44*    (2006.01)
  *H04N 5/50*    (2006.01)

(52) U.S. Cl. ...................... 348/725; 348/731

(58) Field of Classification Search ............... 348/725, 348/731–734; 725/72, 131, 139, 151; 455/179.1, 455/193.1, 269; 342/55, 56, 58, 352, 354, 342/359; *H04N 5/44, 5/50*
See application file for complete search history.

(56) References Cited

U.S. PATENT DOCUMENTS 6,774,863 B2    8/2004    Shirosaka et al.

7,397,516 B2 *    7/2008    Tsukamoto ................. 348/725

FOREIGN PATENT DOCUMENTS

JP    2004-173062 A    6/2004

* cited by examiner

*Primary Examiner*—Sherrie Hsia
(74) *Attorney, Agent, or Firm*—Crowell & Moring LLP

(57) ABSTRACT

An analog TV broadcast receiver connected to a multi-directional antenna has a receiving direction counter for a channel which is set at an initial receiving direction to measure intensity of a TV broadcast signal in the initial receiving direction, when a channel registration in the TV broadcast receiver starts. The measured intensity, if higher than a threshold, is registered in a channel map. The receiving direction counter is sequentially incremented to measure the intensities in all receiving directions. All the measured intensities higher than the threshold are registered in the channel map as best receiving directions. A user can delete one or more of the registered best receiving directions by viewing images on a screen of the TV receiver that are given by the registered best receiving directions. It can solve a problem that a receiving direction which a user considers to give an undesired image remains registered.

3 Claims, 6 Drawing Sheets

| CHANNEL NUMBER | SUB-CHANNEL | BEST RECEIVING DIRECTION | |
|---|---|---|---|
| 3 | 1 | 04 | ⎫ Cu1 |
| 4 | 0 | 01 | ⎭ |
| | | 02 | ⎫ Cu2 |
| | | 03 | ⎭ |
| | | 04 | |
| 6 | 1 | 08 | |
| ⋮ | 2 | | |
| | ⋮ | ⋮ | |

| CHANNEL NUMBER | SUB-CHANNEL | BEST RECEIVING DIRECTION |
|---|---|---|
| 3 | 1 | 04 |
| 4 | 0 | 03 |
| 6 | 1 | 08 |
| ⋮ | 2 | |
| | ⋮ | ⋮ | ific
ANALOG TELEVISION BROADCAST SIGNAL RECEIVER

BACKGROUND OF THE INVENTION

1. Field of the Invention

The present invention relates to an analog television (TV) broadcast signal receiver for receiving analog television broadcast signals such as NTSC (National Television System Committee).

2. Description of the Related Art

Currently in the North American Continent, NTSC (National Television System Committee) analog television broadcast (hereafter referred to simply as "analog TV broadcast") and ATSC (Advanced Television Systems Committee) digital television broadcast (hereafter referred to simply as "digital TV broadcast") coexist. Thus, there are a television receiver capable of receiving analog TV broadcasts (hereafter referred to as "analog TV receiver") and a television receiver capable of receiving digital TV broadcasts (hereafter referred to as "digital TV receiver"). In the current situation where the analog and digital TV broadcasts coexist, a general TV broadcast receiver is already capable of receiving both TV broadcasts. Thus, unless otherwise stated, the term "TV receiver" is used in the present specification to mean a TV receiver capable of receiving both TV broadcasts.

When a user purchases a TV receiver, the user is required to register channels, which the user wishes to view, before the initial viewing. This is because a receiving direction of an antenna to give good received images varies with each channel. Particularly in the North American Continent, big cities spread across the plains. From the viewpoint of each TV user or viewer, TV broadcast signals come from various directions. Thus, it is necessary for the TV user to set the TV receiver so that the TV receiver stores receiving directions to give good received images for channels to view by associating the receiving directions with the channels.

For this reason, multi-directional antennas capable of changing receiving directions, such as a so-called smart antenna, are put to practical use. The EIA (Electronic Industries Association)-909 standard provides a smart antenna having sixteen equiangular receiving directions in 360 degrees omni-directionally. A TV receiver conforming to the EIA-909 standard is set to be able to adjust or change an active receiving direction of the multi-directional antenna such as the smart antenna to every one of the sixteen receiving directions.

Some of such TV broadcast receivers have an automatic scanning function to select and register therein, before the initial viewing of a user after purchasing, a best receiving direction of an antenna for each channel in which a TV broadcast of the each channel can be best received. The automatic scanning function can also be referred to as all-channel omni-directional scanning function. According to the automatic scanning function, a TV broadcast receiver sends control signals to a multi-directional antenna connected to the TV broadcast receiver so as to sequentially change or scan an active receiving direction of the antenna among the sixteen receiving directions (omni-directional scanning) for each channel, and to detect which one of the sixteen receiving directions gives best receiving condition for each channel, whereby the TV broadcast receiver automatically detects and registers best receiving directions for all the channels (all-channel scanning). By providing a TV broadcast receiver with the automatic scanning function, it becomes possible to significantly reduce labor and time for a user to make channel registration after purchasing.

For performing the automatic scanning function to determine which one of the receiving directions of the multi-directional antenna gives best receiving condition (such receiving direction being hereafter referred to as best receiving direction) for each channel, a TV broadcast receiver measures both intensity and bit error rate of a received TV broadcast signal in the case of a digital TV broadcast, while measuring only intensity of a received TV broadcast signal in the case of an analog TV broadcast. In the case of the digital TV broadcast, the best receiving direction of the antenna automatically determined by the TV broadcast receiver agrees well with that determined by a human eye, viewing an actually received image of the TV broadcast. This is because the TV broadcast receiver, operating as a digital TV broadcast receiver, makes the determination on the basis of both the intensity and bit error rate. However, in the case of the analog TV broadcast, the best receiving direction of the antenna determined by the TV broadcast receiver does not always agree with that determined by the human eye, because the TV broadcast receiver, operating as an analog TV broadcast receiver, makes the determination on the basis of only the intensity. This will be described in more detail below.

In the case of the analog TV broadcast, defects appearing on received images can be classified into noise and ghost. If the received images are determined on the basis of only the intensity, it may occur that a receiving direction of the antenna to give significant ghost may be determined as a best receiving direction, if such receiving direction gives little noise. For a user who hates ghost more than noise, the thus determined best receiving direction may not actually be best, and may have to be prevented from being selected. In other words, another receiving direction which gives less ghost, even with more noise, may be a receiving direction for such user to select, depending on the preference of the user. However, an existing analog TV broadcast receiver determines a best receiving direction on the basis of only the intensity of a TV broadcast signal of each channel as described above, and registers such receiving direction therein for the each channel. As a result, it may occur that a user cannot view the channel in a receiving direction which the user prefers to select.

Besides, in a multi-directional antenna capable of receiving both analog and digital TV broadcasts, a technology is known which quickly sets the receiving direction or directivity of the antenna to a broadcast wave to receive (refer e.g. Japanese Laid-open Patent Publication 2004-173062). However, this technology does not reflect the preference of a user to the selection of the receiving direction of the antenna.

SUMMARY OF THE INVENTION

An object of the present invention is to provide such an analog TV broadcast receiver connected to a multi-directional antenna that can register, as best receiving directions, all of multiple receiving directions, if any, to give intensity of a received TV broadcast signal of each channel higher than a predetermined threshold intensity, so as to make it possible for a user to switch or change, with a simple operation later, between TV broadcast receptions of the each channel in the multiple receiving directions, and to delete receiving directions which the user does not prefer to select among the multiple receiving directions, whereby the user can easily view the analog TV broadcast of the each channel in a receiving direction which the user prefers.

According to a first aspect of the present invention, the object is achieved by an analog television broadcast receiver with a screen for display and connected to a multi-directional antenna having multiple receiving directions, the analog television broadcast receiver comprising: a channel setting unit for setting channels, to be received by the multi-directional antenna, at channels each designated by a user at the time of a channel registration; a receiving direction change unit for sequentially changing and setting the receiving directions of the multi-directional antenna for each channel set by the channel setting unit; a received signal intensity storage unit for temporarily storing intensities of an analog television broadcast signal for each channel in respective receiving directions of the multi-directional antenna as changed by the receiving direction change unit; a receiving direction determination unit for determining a best receiving direction(s) for each channel on the basis of the intensities of the analog television broadcast signal stored in the received signal intensity storage unit; a receiving direction storage unit for storing the best receiving direction(s) for the each channel determined by the receiving direction determination unit; and a channel up/down operation unit for selecting a channel by forward or backward channel selection from channels displayed on the screen of the analog television broadcast receiver.

Therein, a best receiving direction(s) for each channel is or are registered at the time of a channel registration by the channel setting unit, the receiving direction change unit, the received signal intensity storage unit, the receiving direction determination unit and the receiving direction storage unit. The receiving direction determination unit determines all such receiving direction(s) as the best receiving direction(s) for the each channel, if there are one or multiple receiving directions for each channel to give higher intensities of the analog television broadcast) signal than a predetermined threshold intensity. The receiving direction storage unit stores the best receiving direction(s), determined by the receiving direction determination unit, as a combination(s) of each channel and the best receiving direction(s) associated with the each channel. The receiving direction change unit makes active the best receiving direction(s) of the selected channel registered, when the user selects a channel after the channel registration, so as to receive an analog television broadcast signal in the best registered receiving direction(s) for the channel. Further, the best receiving direction(s) in the combination(s) of the each channel and the best receiving direction(s) associated with the each channel are changed by the user operating the channel up/down operation unit.

Preferably; the channel setting unit is a channel change unit for sequentially changing and setting channels received by the multi-directional antenna.

According to a second aspect of the present invention, the above-described object is achieved by an analog television broadcast receiver with a screen for display and connected to a multi-directional antenna having multiple receiving directions, the analog television broadcast receiver comprising: a channel change unit for sequentially changing and setting channels received by the multi-directional antenna at the time of a channel registration; a receiving direction change unit for sequentially changing and setting the receiving directions of the multi-directional antenna for each channel set by the channel setting unit; a received signal intensity storage unit for temporarily storing intensities of an analog television broadcast signal for each channel in respective receiving directions of the multi-directional antenna as changed by the receiving direction change unit; a receiving direction determination unit for determining a best receiving direction(s) for each channel on the basis of the intensities of the analog television broadcast signal stored in the received signal intensity storage unit; a receiving direction storage unit for storing the best receiving direction(s) for the each channel determined by the receiving direction determination unit; and a channel up/down operation unit for selecting a channel by forward or backward channel selection from channels displayed on the screen of the analog television broadcast receiver.

Therein, a best receiving direction(s) for each channel is or are registered as a channel map at the time of a channel registration by the channel change unit, the receiving direction change unit, the received signal intensity storage unit, the receiving direction determination unit and the receiving direction storage unit. The receiving direction determination unit determines all such receiving direction(s) as the best receiving direction(s) for the each channel, if there are one or multiple receiving directions for each channel to give higher intensities of the analog television broadcast signal than a predetermined threshold intensity. The receiving direction storage unit stores the best receiving direction(s), determined by the receiving direction determination unit, in the channel map as a combination(s) of each channel and the best receiving direction(s) associated with the each channel. The receiving direction change unit makes active the best receiving direction(s) of the selected channel registered, when the user selects a channel after the channel registration, so as to receive an analog television broadcast signal in the best registered receiving direction(s) for the channel. The analog television broadcast receiver further comprises a receiving direction deletion unit for deleting a best receiving direction, giving an image on the screen, from the channel map by the user operating the channel up/down operation unit. The best receiving direction(s) in the combinations of each channel and the best receiving direction(s) associated with the each channel are changed by the user operating the channel up/down operation unit so as to each give an image on the screen. Further, each of the best receiving direction(s), giving the image on the screen, can be deleted from the channel map by operating the receiving direction deletion unit.

According to the present invention, if there are multiple receiving directions to give higher intensity of a received TV broadcast signal of each channel than a predetermined threshold intensity, the analog television broadcast receiver registers all of the multiple receiving directions. Thus, a user can switch or change, with a channel up/down operation later, between television broadcast receptions of the each channel in the multiple registered receiving directions, and can easily delete a receiving direction(s) which the user does not wish to select among the multiple registered receiving directions, whereby the user can easily view the analog television broadcast of the each channel desirable to the user.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 5 is a view showing an example of a channel map created by the TV broadcast receiver at the time of performing an automatic scanning process;

FIG. 6 is a view showing a channel map after a user has performed a best receiving direction deletion process.

DESCRIPTION OF THE PREFERRED EMBODIMENTS

Figure 1:
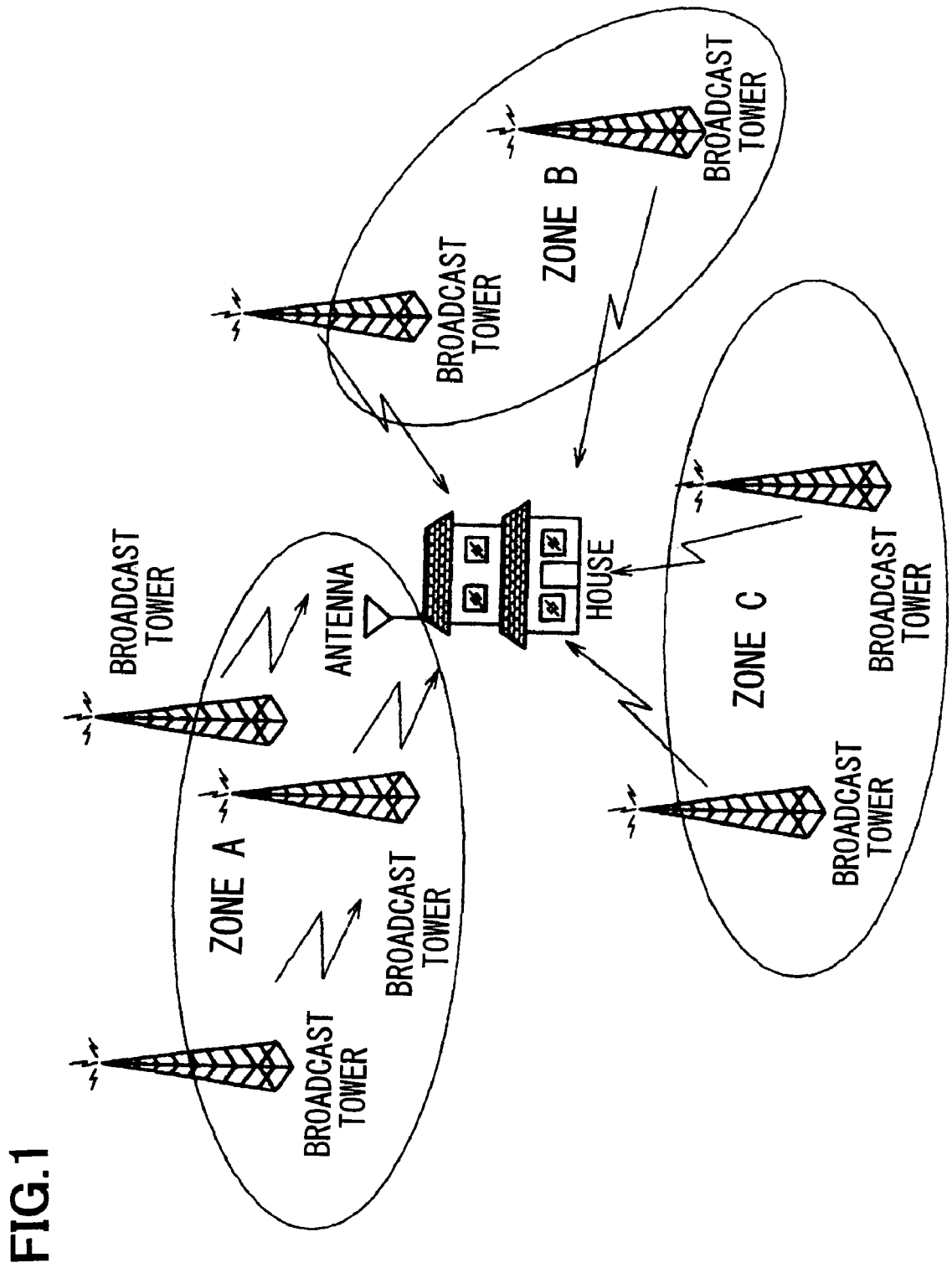
FIG. 1 is a schematic view showing a situation in which a TV broadcast receiver, installed in a home, receives TV broadcast signals.

The best modes and preferred embodiments of the present invention will be described hereinafter with reference to the annexed drawings. Note that the specific embodiments described are not intended to cover the entire scope of the present invention, and hence the present invention is not limited to only the specific embodiments. Also note that like parts are designated by like reference numerals throughout the drawings.

An analog TV (Television) broadcast receiver according to an embodiment of the present invention will be described. Note here that as already described above, a general TV broadcast receiver is capable of receiving both analog and digital TV broadcasts. Thus, the analog TV broadcast receiver according to the present embodiment is assumed to have such capability, and is referred to simply as TV broadcast receiver unless otherwise stated.

FIG. 1 is a schematic view showing a situation in which a TV broadcast receiver, installed in a home of a user such as a TV broadcast receiver 1 shown in FIG. 2 described later, receives TV broadcast signals from broadcast towers (broadcast stations) located in various zones. Here, it is assumed that the TV broadcast receiver in the home of the user can receive TV broadcast signals transmitted from broadcast towers spreading across multiple locations e.g. in zone A, zone B and zone C, and that it is possible to view TV programs (both analog and digital TV broadcasts) transmitted from the broadcast towers. A multi-directional antenna such as a smart antenna as designated by reference numeral 2 in FIG. 2 and having multiple receiving directions is put to practical use for such situation.

Figure 2:
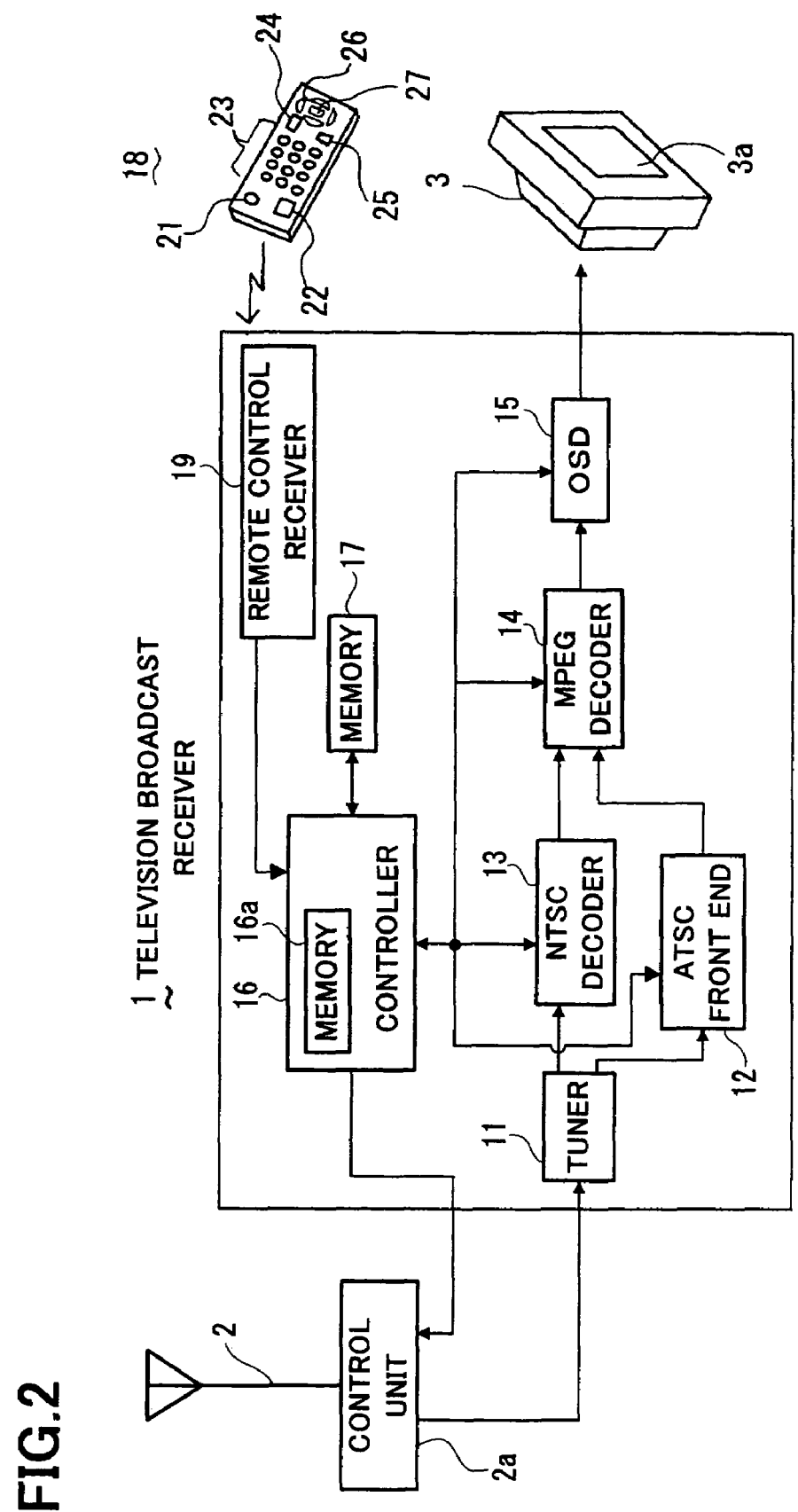
FIG. 2 is a schematic block diagram showing a TV broadcast signal receiver according to an embodiment of the present embodiment.

Referring to the schematic block diagram of FIG. 2, a TV broadcast receiver 1 according to the present embodiment is connected to a multi-directional antenna 2. For a channel registration, the TV broadcast receiver 1 receives, and measures receiving conditions (intensities) of, a TV broadcast signal in respective sixteen receiving directions as provided by the EIA-909 standard. The TV broadcast receiver 1 performs the reception and measurement for all channels, and stores all receiving directions of each channel which give intensities of received TV broadcast signals higher than a predetermined threshold intensity. When a user selects the channels one by one by with a channel up/down operation later, the channels are changed or switched accordingly, and at the same time such receiving directions in each channel giving the intensities higher than the threshold intensity are sequentially changed.

The TV broadcast receiver 1 comprises: a tuner 11 connected to the multi-directional antenna 2 for receiving a TV broadcast signal; an ATSC (Advanced Television Systems Committee) front end 12 for subjecting a digital TV broadcast signal received by the tuner 11 to predetermined signal processing, and decoding the digital TV broadcast signal; an NTSC (National Television System Committee) decoder 13 for decoding an analog TV broadcast signal received by the tuner 11; an MPEG (Motion Picture Experts Group) decoder 14 (decoded signal output unit) for decoding the TV broadcast signal which is an MPEG-compressed signal; and an on-screen display (hereafter referred to simply as "OSD") unit 15 for superimposing a signal of a predetermined display image on the decoded TV broadcast signal to produce a combined image signal and for outputting the combined image signal to a monitor 3.

The TV broadcast receiver 1 further comprises a controller (microprocessor) 16 for detecting receiving conditions of TV broadcast signals received by the tuner 11 so as to control a control unit 2a of the multi-directional antenna 2, and for controlling the entire TV broadcast receiver 1, namely for controlling respective units and elements in the TV broadcast receiver 1 including the ATSC front end 12 and the NTSC decoder 13. The controller 16 contains a memory 16a for storing (a) receiving directions in which intensities of received TV broadcast signals are measured, (b) the measured signal intensities, (c) a channel map for storing channel numbers and best receiving directions for the respective channel numbers, and so on, as will be described in detail later. The TV broadcast receiver 1 still further comprises other units and elements including a memory 17 for temporarily storing the decoded TV broadcast signal and storing the display image to be superimposed on the decoded TV broadcast signal, and so on. The TV broadcast signal decoded by the MPEG decoder 14 is output via the OSD unit 15 to the monitor 3 for display.

The TV broadcast receiver 1 further comprises a remote control receiver 19 connected to the controller 16 for receiving an infrared signal from a remote control 18. When a user operates the remote control 18 to input various commands (such as power supply on/off command and channel change command), the commands are input via the remote control receiver 19 to the controller 16, which in turn sends control signals to respective units and elements of the TV broadcast receiver 1, and thereby operates the respective units and elements according to the commands. For this purpose, the remote control 18 has various keys such as a power supply key 21, a mode switch key 22 for switching between analog and digital TV broadcast receptions, numeric keys 23, a channel up/down key 24 for selecting reception channels forward or backward, a menu key 25 for displaying a menu image on a screen 3a of the monitor 3, a cross key 26 and a decision key 27.

The control unit 2a of the multi-directional antenna 2 starts its operation in response to a receiving direction control signal from the controller 16, and makes active one of multiple receiving directions of the multi-directional antenna 2 which one is commanded by the receiving direction control signal, after the connection of the multi-directional antenna 2 to the tuner 11 is detected. If the multi-directional antenna 2 is the type that changes the receiving direction by rotating the antenna using a motor, the control unit 2a controls the rotation of the motor so as to point the antenna in the commanded direction. On the other hand, if the multi-directional antenna 2 is the type that selects an active antenna direction by turning on and off electronic switches, the control unit 2a turns on one of the electronic switches corresponding to the commanded direction, and turns off the other electronic switches.

Figure 3:
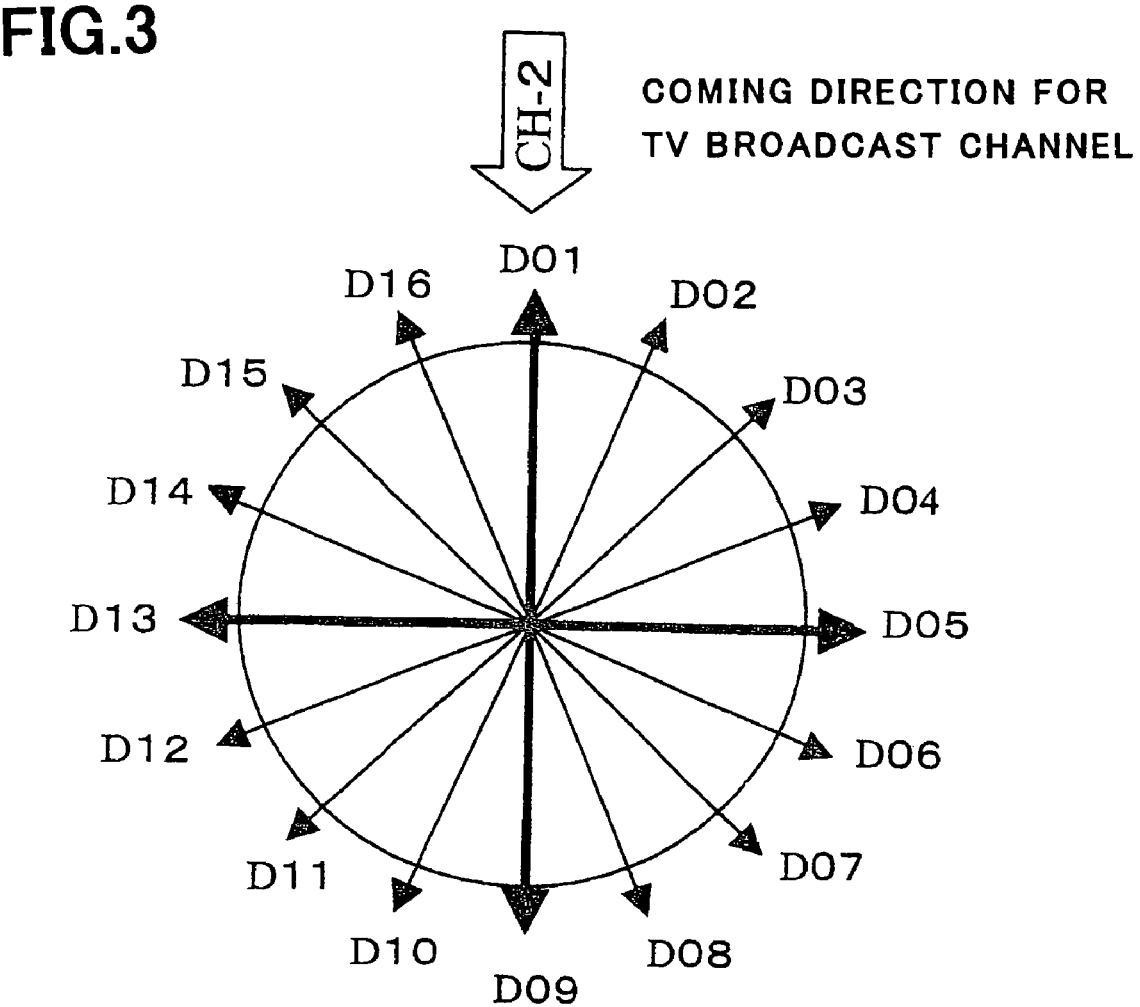
FIG. 3 is a chart showing multiple receiving directions of a multi-directional antenna connected to the TV broadcast signal receiver, in which an example of a receiving condition is indicated.

FIG. 3 is a chart showing and explaining multiple receiving directions of the smart antenna 2, in which an example of a receiving condition is indicated. When connected to the multi-directional antenna (smart antenna) 2, the TV broadcast receiver 1 according to the present embodiment receives, and measures receiving conditions of, TV broadcast signals coming from sixteen receiving directions provided in the EIA-909 standard as indicated by D01 to D16 in FIG. 3, respectively.

For example, if a broadcast wave of Channel 2 comes from a direction indicated by arrow "CH-2" shown in FIG. 2, the broadcast wave of Channel 2 can be best received by making active the receiving direction D01 of the multi-directional antenna 2. More specifically, intensity of a broadcast signal received by the multi-directional antenna 2 in the receiving direction D01 gives a maximum value at this time.

Figure 4:
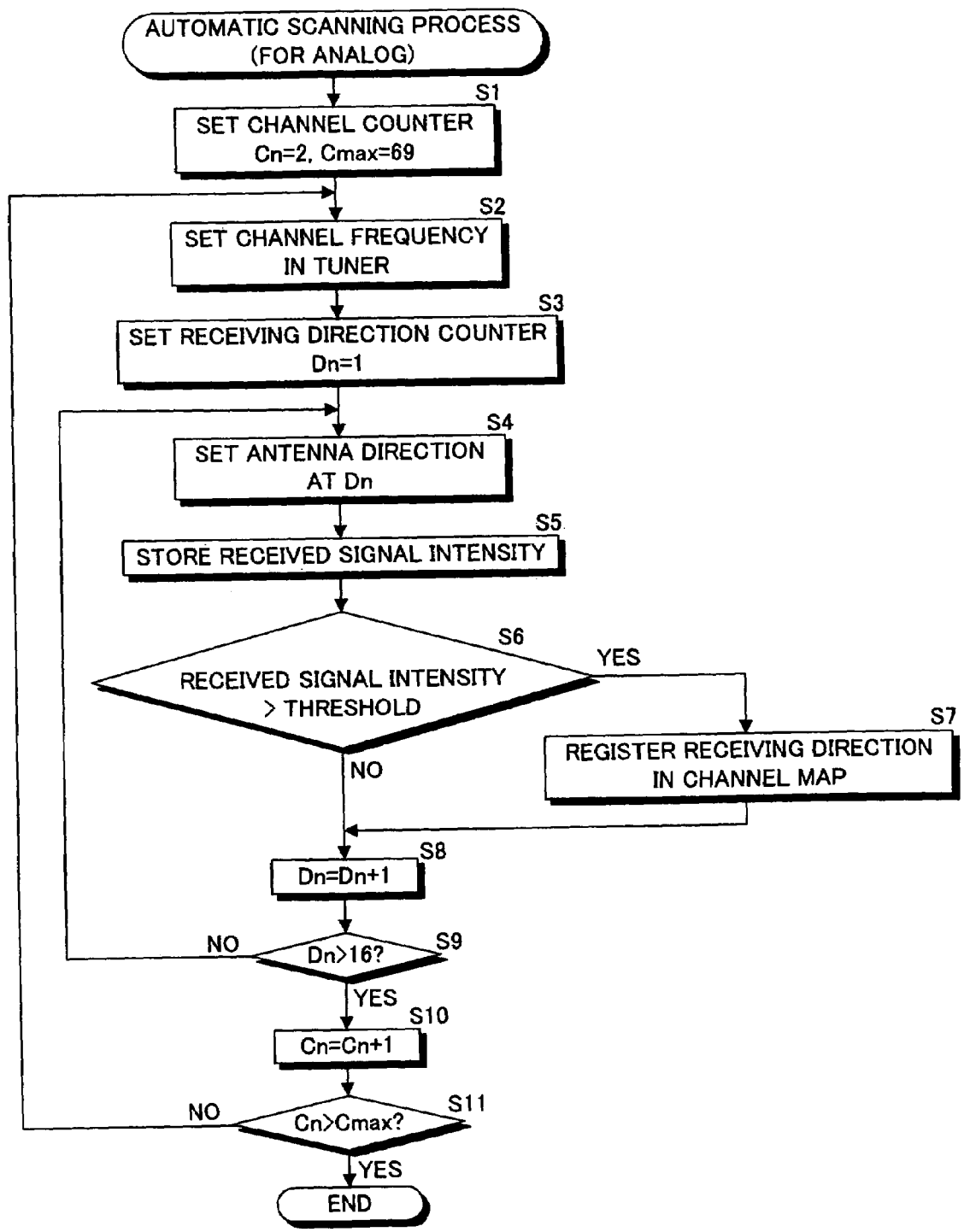
FIG. 4 is a flow chart showing an automatic scanning process to be performed in the TV broadcast receiver.

Referring now to the flow chart of FIG. 4, the following describes an automatic scanning process (channel registration) to be performed in a TV broadcast receiver 1 before the initial viewing of a user after purchasing the TV broadcast receiver 1. As described above, the automatic scanning can also be referred to as all-channel omni-directional scanning. This is because according to the automatic scanning, the TV broadcast receiver 1 sends control signals to the control unit 2a of the multi-directional antenna 2 so as to sequentially change (scan) an active receiving direction of the multi-directional antenna 2 among the sixteen receiving directions, and to detect which one of the sixteen receiving directions gives best receiving condition for each channel. This scanning process for each channel can thus be referred to as an omni-directional scanning process. The TV broadcast receiver 1 automatically performs this omni-directional scanning process for all channels, which can thus be referred to as an all-channel scanning. An example of an automatic scanning process (i.e. automatic all-channel omni-directional process) will be described hereinafter in the case of analog TV broadcasts, in which the controller 16 manages and performs all the steps therein.

When a user operates the remote control 18 to command an automatic scanning process, the controller 16 sets a channel counter by setting an initial value of variable Cn of channel number at "2" (Cn=2), and a maximum value Cmax of channel number at "69" (Cmax=69) (S1). Next, the controller 16 sets the tuner 11 at the frequency of the channel (Channel 2) to be subjected to an omni-directional scanning (S2), and further sets a receiving direction counter by setting an initial value of variable Dn of receiving direction at "1" (Dn=1) (S3). Based on the thus set receiving direction counter (Dn=1), the controller 16 sets the multi-directional antenna 2 to make receiving direction D01 active (S4). The controller 16 controls the tuner 11 to measure intensity of a TV broadcast signal received in the receiving direction D01, and temporarily stores the thus measured signal intensity in the memory 16a of the controller 16 (S5), whereby the controller 16 serves as a "received signal intensity storage unit".

If the thus stored signal intensity is higher than a predetermined threshold intensity (YES in S6), the controller 16 registers such receiving direction (D01) in a channel map 30 described later (S7). On the other hand, if the thus stored signal intensity is not higher than the predetermined threshold intensity (NO in S6), the controller 16 adds "1" to the receiving direction counter to change the receiving direction to a subsequent receiving direction (Dn=Dn+1) (S8). Then, if the value of the receiving direction counter does not exceed "16" (NO in S9), the process goes back to the step S4, and the controller 16 performs the comparison between the threshold intensity and the intensity of the TV broadcast signal received in the subsequent receiving direction, which, if higher than the threshold intensity, the controller 16 registers in the channel map 30, so as to repeat the steps S4 to S9 until the value of the receiving direction counter exceeds "16".

In this way, the controller 16 creates a channel map 30 in the memory 16a thereof, which will be described in detail with reference to FIG. 5. FIG. 5 is a view showing an example of a channel map 30 created by the TV broadcast receiver 1 at the time of performing an automatic scanning process in the case where channels of analog and digital TV broadcasts are registered in the same channel map 30. In this example, Channel 4 is an analog TV broadcast channel, while Channels 3 and 6 are digital TV broadcast channels. Thus, emphasis of the description below will be put on the analog channel, Channel 4. Note here that a sub-channel column 31 of the channel map 30 shows numbers of virtual channels. Since Channel 4 is an analog channel, it does not contain any sub-channel, so that "0" is registered in the sub-channel column 31 for Channel 4. (Channels 3 and 6 are digital channels, so that they contain sub-channels.)

A best receiving direction column 32 of the channel map 30 shows receiving directions to give received signal intensities higher than the predetermined threshold intensity for each channel. In other words, the receiving directions registered in the step S7 described above are registered in the best receiving direction column 32. This example indicates that four receiving directions, D01 to D04, give received signal intensities higher than the threshold intensity, so that numbers "01" to "04" are registered in the best receiving direction column 32 for Channel 4. In this manner, the best receiving direction or directions for each channel are registered in the best receiving direction column 32 of the channel map 30 as a group associated with the each channel.

Referring back to the flow chart of FIG. 4, if YES in S9, namely if the receiving direction counter exceeds "16" in the step S9 (Dn>16), it means that the controller 16 has completed analysis of the multi-directional antenna 2 in all the sixteen directions for the initial channel, and also completed registration of best receiving directions for the initial channel. Thus, the controller 16 adds "1" to the channel counter (Cn=Cn+1) (S10). Thereafter, if the value of the channel counter does not exceed Cmax=69 (NO in S11), the process goes back to the step S2, and the controller 16 repeats the steps S2 to S11 until the value of the channel counter exceeds Cmax=69 (Cn>Cmax=69).

When Cn>Cmax=69, the automatic scanning process (i.e. channel registration for an analog TV broadcast) ends, thereby ending the extractions and registrations of best receiving directions for all the channels (Channel 2 to Channel 69). Note here that by performing the step S6 and the step S7 in the flow chart of FIG. 4, the controller 16 with the related units and elements serves as a "receiving direction determination unit" and a "receiving direction storage unit", respectively. Similarly, by performing the combination of the steps S1, S2, S10 and S11, and the combination of the steps S3, S4, S8 and S9 in the flow chart of FIG. 4, the controller 16 with the related units and elements serves as a "channel change unit" and a "receiving direction change unit", respectively.

As described above already, the TV broadcast receiver 1 according to the present embodiment is capable of receiving not only analog TV broadcasts, but also digital TV broadcasts. For example, the TV broadcast receiver 1 can perform an automatic scanning process (channel registration) for digital TV broadcasts, continuously after the flow chart of FIG. 4, in a manner similar to the process as shown by the flow chart of FIG. 4. In the automatic scanning process for each channel of digital TV broadcasts, a criteria of whether bit error rate of each received TV broadcast signal is higher than a predetermined value can be used (in addition to the criteria of whether intensity of the each received TV broadcast signal is higher than the predetermined intensity), so as to select a receiving direction to give best or lowest bit error rate, whereby an optimum receiving direction for each channel can be determined. Thus, as shown in FIG. 5, the channel map 30 containing the results of both automatic scanning processes for the analog and digital TV broadcasts has multiple best receiving directions registered therein for the channel of analog TV broadcasts (Channel 4) and a single best receiving direction registered therein for each of the channels of digital TV broadcasts (Channels 3 and 6).

Next, the following describes operations of a user to use the channel map 30 shown in FIG. 5 at the time of normal viewing, after the channel map 30 is created by performing the automatic scanning processes (channel registrations) before the initial viewing after purchasing the TV broadcast receiver 1 of the present embodiment. In normal viewing, the user presses the numeric keys 23 of the remote control 18 to select and input a number of a channel to view. If the input channel number is present in the channel map 30, the controller 16 makes active a best receiving direction or directions registered in the best receiving direction column 32 which is or are associated with the input channel number. For example, if channel number 3 is input, the receiving direction "04" (D04) of the multi-directional antenna 2 is made active. The controller 16 then displays received images in the active receiving direction on the screen 3a of the monitor 3.

The user can operate the channel up/down key 24 to select a channel by forward or backward channel selection from channels displayed on the screen 3a of the monitor 3. Thus, the channel up/down key 24 with the related units and elements serves as a "channel up/down operation unit". According to the present embodiment, it is so designed that when the user operates the channel up/down key 24 to increase the channel number, the rows of the channel map 30 are sequentially scrolled down to sequentially receive or give images in order of the registered channels and in order of the registered best receiving directions in each registered channel. In the example of the channel map 30 shown in FIG. 5, assume that Channel 3 is currently selected by the channel up/down key 24. When the user presses the channel up/down key 24 once to increase the channel number under this assumption, the selected channel is changed from Channel 3 to Channel 4, and the best receiving direction in the best receiving direction column 32 is changed from "04" (D04) to "0" (D01) as shown by arrow Cu1.

When the user presses the channel up/down key 24 once again to increase the channel number, the selected channel stays at the same Channel 4, but the selected receiving direction is changed from "01" (D01) to "02" (D02) as shown by arrow Cu2. If the user continues to press the channel up/down key 24 to increase the channel number, the best receiving directions in the best receiving direction column 32 are further changed sequentially downward in FIG. 5. On the other hand, if the user keeps pressing the channel up/down key 24 to decrease the channel number, the best receiving directions in the best receiving direction column 32 are changed sequentially upward in FIG. 5.

Figure 7:
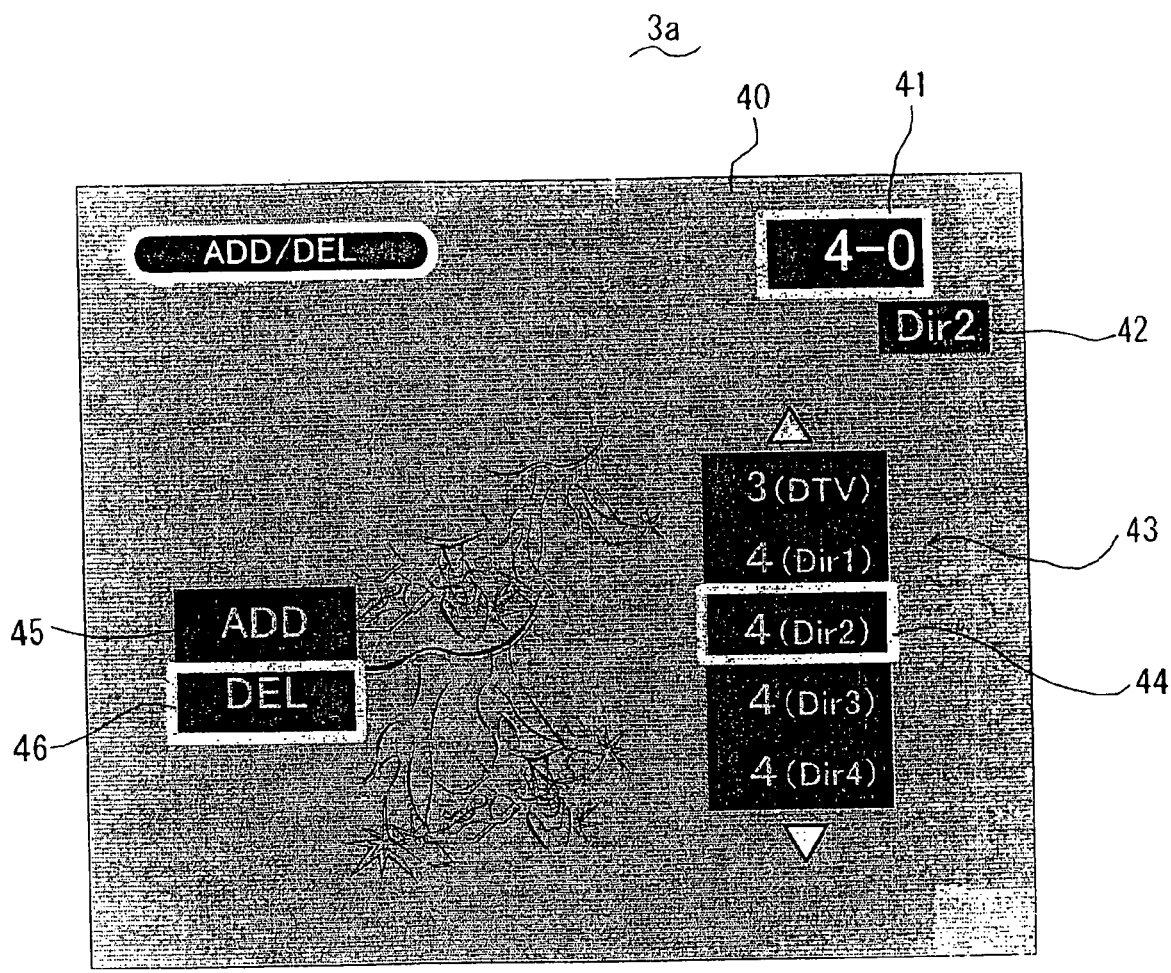
FIG. 7 is a view showing an image of a screen of a monitor at the time of performing the best receiving direction deletion process.

Referring now to FIG. 7 showing an image of the screen 3a of the monitor 3, the following describes a best receiving direction deletion process which the controller 16, with related units and elements, performs to delete best receiving directions for channels of analog TV broadcasts in the channel map 30. As apparent from the description below, the controller 16 with the related units and elements, serves as a "receiving direction deletion unit". When a user operates the remote control 18 in the manner as described above so as to cause the controller 16 to set the TV broadcast receiver 1 to receive Channel 4 with best receiving direction "02", and further operates the menu key 25 of the remote control 18 so as to cause the controller 16 to select a receiving direction deletion process, then the controller 16 controls to display an image, e.g. shown in FIG. 7, on the screen 3a of the monitor 3. More specifically, the controller 16 controls to display, on the screen 3a, a moving live image 40 of Channel 4 received in the receiving direction "02" (D02), and also display a below-described OSD image for deleting various receiving directions with the live image 40 being displayed as a background.

Displayed in the upper right part of the screen 3a is a channel number image frame 41 for showing a channel number and a sub-channel number as well as a receiving direction image frame 42 for showing a current receiving direction of the multi-directional antenna 2. On the screen 3a of FIG. 7, the channel number image frame 41 and the receiving direction image frame 42 are displayed as "4-0" (Channel 4 with sub-channel 0) and "Dir2" (D02), respectively. In the middle right of the screen 3a, five combinations each of a channel number and a best receiving direction are displayed as a table 43, in which the combination of the currently received channel and its receiving direction is positioned in the center with two preceding combinations and two following combinations. More specifically, the five combinations in the table 43 of FIG. 7 are "3 (Dir 4)", "4 (Dir1)", "4 (Dir2)", "4 (Dir3)" and "4 (Dir4)". In other words, the table 43 displays five combinations of channel numbers and best receiving directions extracted from the channel map 30, taking the combination of the currently received channel and its receiving direction as the center.

Initially, the controller 16 controls to display a cursor 44 on the combination of the currently received channel and its receiving direction. The controller 16 can control to move the cursor 44 upward and downward when the cross key 26 of the remote control 18 is operated by the user. Thus, similarly as with the channel up/down key 24, the cursor 44 can be used to select the combinations of the channel numbers and best receiving directions, either forward or backward, according to such combinations in the channel map 30. More specifically, when the cursor 44 is moved one row down from the position shown in FIG. 7 to be positioned on "4 (Dir3)", the channel number stays at Channel 4, but the receiving direction of the multi-directional antenna 2 is changed to "03" (D03), so that the live image 40 on the screen 3a is also changed to a new image in the new receiving direction D03.

Besides, the controller 16 controls to display, on the screen 3a, an addition/deletion image frame 45 with "ADD" and "DEL" which is provided to show a currently performed mode for the selection of the combination of channel and best receiving direction. When the remote control 18 is operated by the user to switch the position of the cursor 46 between "DEL" and "ADD", the controller 16 can switch the mode between deletion and addition. The addition mode ("ADD") is used to add a new best receiving direction, if any, to the channel map 30. Since the emphasis of the present embodiment is on the deletion mode, further description of the addition mode is omitted. On the other hand, the deletion mode ("DEL") is used to delete one or more of the best receiving directions in the best receiving direction column 32 of the channel map 30, as will be described below.

In a manner as described above, a user can display, on the screen 3a of the monitor 3, desired combinations of channels and their best receiving directions in the channel map 30 by operating the remote control 18. Thereby, the user can view and compare images received in different best receiving directions, if any, for each same channel. In the case of the example of channel map 30 shown in FIG. 5, the user can view and compare live images 40 which are received in best receiving directions "01" to "04" (D01 to D04) by sequentially changing the best receiving directions, and which are displayed on the screen 3a of the monitor 3. If the user considers, for example, that the live image 40 received in the best receiving direction "03" (D03) is the most preferable, the user can operate to delete the best receiving directions "01", "02" and "04" (D01, D02 and D04) from the channel map 30.

More specifically, in order to delete e.g. the best receiving direction D01 of Channel 4 in this example, the user first selects the deletion mode in the addition/deletion image frame 45 by placing the cursor 44 on "DEL". The user then selects the receiving direction "01" (D01 or Dir1) by using either the cursor 44 or the channel up/down key 24, thereby changing the live image 40 on the screen 3a to that in the receiving direction "01", and presses the decision key 27, whereby the row of best receiving direction "01" of Channel 4 in the channel map 30 is deleted. In a similar manner, the user can delete each of the other best receiving directions "02" and "04" of Channel 4 in the channel map 30, so as to leave one best receiving direction "03" for Channel 4 in the channel map 30.

FIG. 6 is a view showing a channel map 30 after the user has performed the best receiving direction deletion process as described here. By leaving one best receiving direction which the user has selected for Channel 4 for analog TV broadcasts in the channel map 30 as shown in FIG. 6, the analog broadcast for Channel 4 can always be received in the best receiving direction, which is the most preferable to the user, when the user operates the remote control 18 to select Channel 4 after the best receiving direction deletion process. More specifically, if the user presses "4" in the numeric keys 23 of the remote control 18 to select Channel 4 after the deletion process, the receiving direction D03 of the multi-directional antenna 2 is made active, and images of Channel 4 received in the receiving direction D03 are displayed on the monitor 3.

It is to be noted that the present invention is not limited to the above embodiments, and various modifications are possible. For example, according to the above embodiments, the menu key 25 of the remote control 18 is operated to display, on the screen 3a of the monitor 3, e.g. the table 43 and the cursor 44 for OSD image display which are shown in FIG. 7, and which are used to perform the best receiving direction deletion process. The user operates such OSD image display to delete one or more of best receiving directions for each channel in the channel map 3 as selected by the user. As methods for deleting a best receiving direction or directions in the channel map 30, however, various other operations are possible.

For example, it is possible for the remote control 18 to have a special key provided thereon which, when pressed, can directly delete, from the channel map 30, the current receiving direction in which a live image 40 currently displayed on the screen 3a is received. An advantage of such special key is that it makes it unnecessary for the user to perform various operations for the best receiving direction deletion on the basis of the menu displayed on the screen 3a by pressing the menu key 25, although it has a disadvantage that the number of keys on the remote control 18 is thereby increased.

Furthermore, according to the above embodiments, the present invention is applied to the channel registration by the automatic scanning process, i.e. all-channel omni-directional scanning process, in the TV broadcast receiver 1 before the initial viewing of a user after purchasing the TV broadcast receiver 1. In it, when an active receiving direction of the multi-directional antenna 2 is sequentially changed (scanned) among the sixteen receiving directions in each of all channels for the automatic scanning, all receiving directions to give a received signal intensity higher than a predetermined threshold intensity for the each of all channels are registered in the channel map 30.

However, the present invention can also be applied to a channel registration process other than such automatic scanning process. For example, the present invention can be applied to a known one-channel omni-directional scanning process (hereafter referred to as "individual scanning process"), in which an active receiving direction of the multi-directional antenna 2 is sequentially changed (scanned) among the sixteen receiving directions in one certain channel set by a user. Note here that the embodiment in which the present invention is applied to the individual scanning process corresponds to the invention according to claim 1.

The individual scanning process will be described in more detail below by comparing it with the automatic scanning process. As described with reference to the flow chart of FIG. 4, the automatic scanning process is performed in a manner that the TV broadcast receiver 1 itself (more specifically controller 16) performs the steps S1, S2, S10 and S11 (function of channel change unit) to automatically change the channels so as to make it possible to extract a best receiving direction or directions for each of all channels, from Channel 2 to Channel 69. In contrast, the individual scanning process is performed in a manner that, instead of performing the steps S1, S2, S10 and S11 (i.e. without having the function of channel change unit), the TV broadcast receiver 1 itself (more specifically controller 16) performs to set, as a channel to be received, a channel which the user inputs or designates by using the remote control 18 as a channel whose best receiving direction or directions are to be extracted. By performing such channel setting, the controller 16 with related units and elements in the TV broadcast receiver 1 serves as a "channel setting unit".

For example, if a user selects Channel 4 using the remote control 18, the controller 16 sets the channel frequency of the tuner 11 at Channel 4 in the TV broadcast receiver 1, and performs steps similar to those from S3 to S9 in the flow chart of FIG. 4, so as to register a best receiving direction or directions for Channel 4 selected by the user, whereby the controller 16 creates a portion (for Channel 4) of a channel map 30 in the individual scanning process. When the user wishes a channel map 30 to be created for a further channel or channels, the controller 16 performs a similar process to create a channel map 30 for the further channel or channels.

At any rate, in each channel registration by either the automatic scanning process or the individual scanning process, the controller 16 registers all multiple receiving directions, if any, for each channel as best receiving directions for the each channel in the channel map 30, if the multiple receiving directions give received signal intensities higher than a predetermined threshold intensity. Accordingly, after the channel registration, namely registration of the combination of each channel and the best receiving direction(s) in the channel map 30, a user can easily delete one or more of the best receiving directions registered in the channel map 30, which the user does not prefer, by changing TV broadcast receptions in the multiple receiving directions for each channel, using the remote control 18 for e.g. channel up/down, so as to leave e.g. one best receiving direction in the channel map 30 which the user considers to give best receiving condition. Thus, at the time of selection of analog TV broadcast channels after the channel registration, it is possible to display, on the monitor 3, received images which the user itself considers to be good.

In addition, although the analog TV broadcast receiver according to the above embodiments is assumed to be capable of receiving both analog and digital TV broadcasts, it is a matter of course that the analog TV receiver can be designed to be capable of receiving only analog TV broadcasts.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. An analog television broadcast receiver with a screen for display and connected to a multi-directional antenna having multiple receiving directions, the analog television broadcast receiver comprising:

a channel setting unit for setting channels, to be received by the multi-directional antenna, at channels each designated by a user at the time of a channel registration;

a receiving direction change unit for sequentially changing and setting the receiving directions of the multi-directional antenna for each channel set by the channel setting unit;

a received signal intensity storage unit for temporarily storing intensities of an analog television broadcast signal for each channel in respective receiving directions of the multi-directional antenna as changed by the receiving direction change unit;

a receiving direction determination unit for determining a best receiving direction(s) for each channel on the basis of the intensities of the analog television broadcast signal stored in the received signal intensity storage unit;

a receiving direction storage unit for storing the best receiving direction(s) for the each channel determined by the receiving direction determination unit; and a channel up/down operation unit for selecting a channel by forward or backward channel selection from channels displayed on the screen of the analog television broadcast receiver, wherein: a best receiving direction(s) for each channel is or are registered at the time of a channel registration by the channel setting unit, the receiving direction change unit, the received signal intensity storage unit, the receiving direction determination unit and the receiving direction storage unit;

the receiving direction determination unit determines all such receiving direction(s) as the best receiving direction(s) for the each channel, if there are one or multiple receiving directions for each channel to give higher intensities of the analog television broadcast signal than a predetermined threshold intensity;

the receiving direction storage unit stores the best receiving direction(s), determined by the receiving direction determination unit, as a combination(s) of each channel and the best receiving direction(s) associated with the each channel;

the receiving direction change unit makes active the best receiving direction(s) of the selected channel registered, when the user selects a channel after the channel registration, so as to receive an analog television broadcast signal in the best registered receiving direction(s) for the channel; and the best receiving direction(s) in the combination(s) of the each channel and the best receiving direction(s) associated with the each channel are changed by the user operating the channel up/down operation unit.

2. The analog television broadcast receiver according to claim 1,
wherein the channel setting unit is a channel change unit for sequentially changing and setting channels received by the multi-directional antenna.

3. An analog television broadcast receiver with a screen for display and connected to a multi-directional antenna having multiple receiving directions, the analog television broadcast receiver comprising:

a channel change unit for sequentially changing and setting channels received by the multi-directional antenna at the time of a channel registration;

a receiving direction change unit for sequentially changing and setting the receiving directions of the multi-directional antenna for each channel set by the channel setting unit;

a received signal intensity storage unit for temporarily storing intensities of an analog television broadcast signal for each channel in respective receiving directions of the multi-directional antenna as changed by the receiving direction change unit;

a receiving direction determination unit for determining a best receiving direction(s) for each channel on the basis of the intensities of the analog television broadcast signal stored in the received signal intensity storage unit;

a receiving direction storage unit for storing the best receiving direction(s) for the each channel determined by the receiving direction determination unit; and a channel up/down operation unit for selecting a channel by forward or backward channel selection from channels displayed on the screen of the analog television broadcast receiver, wherein: a best receiving direction(s) for each channel is or are registered as a channel map at the time of a channel registration by the channel change unit, the receiving direction change unit, the received signal intensity storage unit, the receiving direction determination unit and the receiving direction storage unit;

the receiving direction determination unit determines all such receiving direction(s) as the best receiving direction(s) for the each channel, if there are one or multiple receiving directions for each channel to give higher intensities of the analog television broadcast signal than a predetermined threshold intensity;

the receiving direction storage unit stores the best receiving direction(s), determined by the receiving direction determination unit, in the channel map as a combination(s) of each channel and the best receiving direction(s) associated with the each channel;

the receiving direction change unit makes active the best receiving direction(s) of the selected channel registered, when the user selects a channel after the channel registration, so as to receive an analog television broadcast signal in the best registered receiving direction(s) for the channel;

the analog television broadcast receiver further comprises a receiving direction deletion unit for deleting a best receiving direction, giving an image on the screen, from the channel map by the user operating the channel up/down operation unit;

the best receiving direction(s) in the combinations of each channel and the best receiving direction(s) associated with the each channel are changed by the user operating the channel up/down operation unit so as to each give an image on the screen; and each of the best receiving direction(s), giving the image on the screen, can be deleted from the channel map by operating the receiving direction deletion unit.

* * * * *